(12) United States Patent
Hattori et al.

(10) Patent No.: US 7,368,842 B2
(45) Date of Patent: May 6, 2008

(54) ARMATURE WINDINGS AND DYNAMO-ELECTRIC MACHINE USING THE SAME

(75) Inventors: Kenichi Hattori, Hitachi (JP); Kazuhiko Takahashi, Hitachi (JP); Kazumasa Ide, Hitachiota (JP); Takashi Shibata, Hitachi (JP); Takashi Watanabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 11/242,003

(22) Filed: Oct. 4, 2005

(65) Prior Publication Data

US 2006/0028086 A1 Feb. 9, 2006

Related U.S. Application Data

(62) Division of application No. 10/995,125, filed on Nov. 24, 2004, now abandoned.

(30) Foreign Application Priority Data

Nov. 28, 2003 (JP) .............................. 2003-398331

(51) Int. Cl.
*H02K 3/22* (2006.01)
*H02K 3/04* (2006.01)
*H02K 3/40* (2006.01)
*H02K 3/14* (2006.01)

(52) U.S. Cl. ...................... 310/213; 310/195; 310/208; 310/64

(58) Field of Classification Search ................ 310/184, 310/195–198, 201, 208, 64, 213
See application file for complete search history.

(56) References Cited

U.S. PATENT DOCUMENTS

| | | | | |
|---|---|---|---|---|
| 1,777,226 A | * | 9/1930 | Ludwig | 310/213 |
| 2,821,641 A | | 1/1958 | Ringland et al. | |
| 3,010,038 A | * | 11/1961 | Manni | 310/64 |
| RE27,489 E | * | 9/1972 | Brenner | 310/213 |
| 3,825,783 A | * | 7/1974 | Duffert | 310/213 |
| 3,860,744 A | * | 1/1975 | Schuler | 174/117 FF |
| 3,950,665 A | * | 4/1976 | Schneider et al. | 310/260 |
| 3,978,359 A | * | 8/1976 | Kultzow et al. | 310/260 |
| 4,128,779 A | * | 12/1978 | Salon | 310/213 |
| 4,308,476 A | * | 12/1981 | Schuler | 310/45 |
| 6,453,545 B1 | * | 9/2002 | Hatley et al. | 29/732 |
| 6,498,415 B1 | * | 12/2002 | Emery | 310/196 |

FOREIGN PATENT DOCUMENTS

| | | | |
|---|---|---|---|
| JP | 47-12513 | | 6/1972 |
| JP | 7-23540 | * | 1/1995 |
| SU | 1690086 A1 | * | 11/1991 |

* cited by examiner

*Primary Examiner*—Burton Mullins
(74) *Attorney, Agent, or Firm*—McDermott Will & Emery LLP

(57) ABSTRACT

An armature winding includes a plurality of strand groups each having strands transposed and bound in at least two rows and multiple tiers, and a main insulator for covering the strand group. The strands belonging to a strand group on one side of a central strand group has a cross-sectional area smaller than that of the control strand group, and the strands belonging to the strand group on the other side of the central strand group has a cross-sectional area larger than that of the central strand group.

2 Claims, 8 Drawing Sheets

360° TRANSPOSITION

FIG. 18B PRIOR ART

540° TRANSPOSITION

FIG. 19 PRIOR ART

ARMATURE WINDINGS AND DYNAMO-ELECTRIC MACHINE USING THE SAME

RELATED APPLICATIONS

This application is a divisional of application Ser. No. 10/995,125, filed Nov. 24, 2004, now abandoned which claims priority of Japanese Application No. 2003-398331, filed Nov. 28, 2003, the contents of which are hereby incorporated by reference.

BACKGROUND OF THE INVENTION

1. Field of the Invention

The present invention relates to armature windings and a dynamo-electric machine using the same, and more particularly, to armature windings suitable for exposure to a varying magnetic field, such as armature windings of a turbine generator, by way of example, and a dynamo-electric machine using the same.

2. Description of the Related Art

Figure 17:
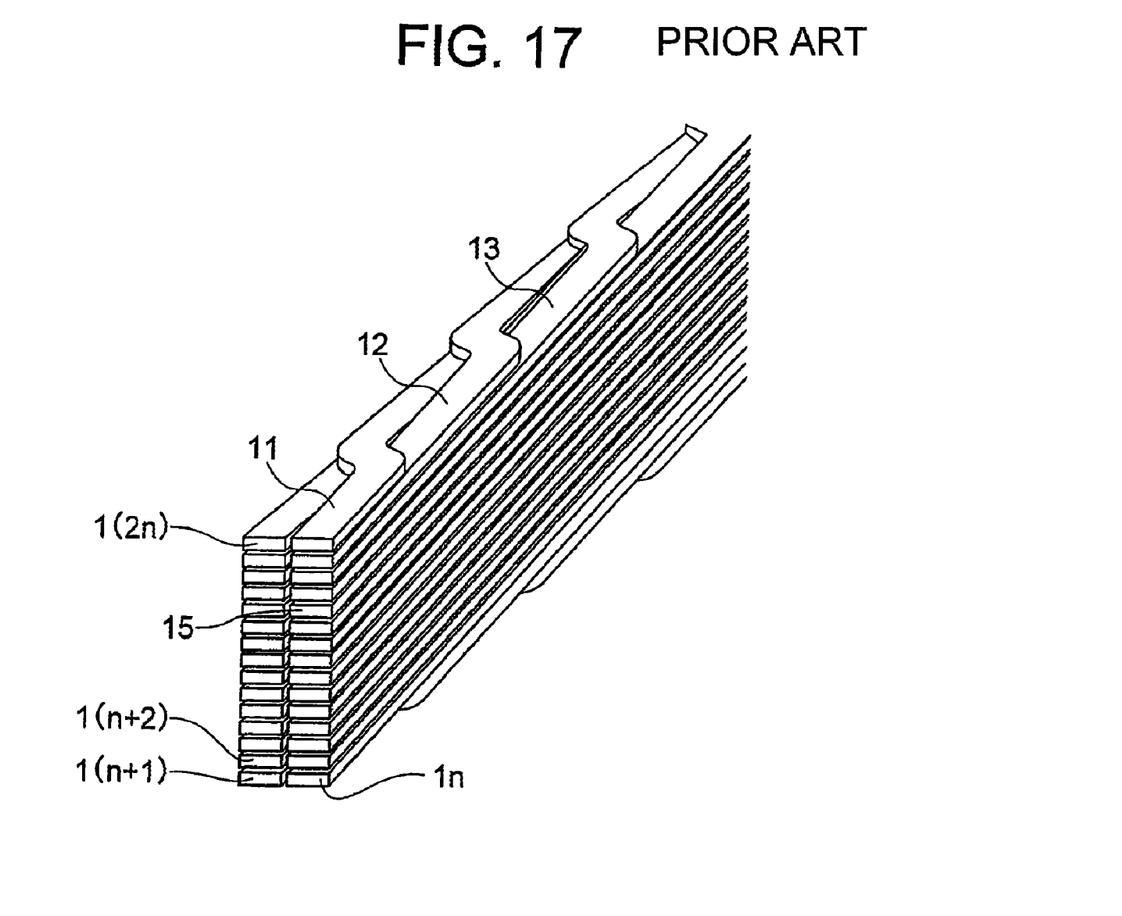
FIG. 17 is a partial perspective view illustrating how strands are transposed in a conventional two-row winding.
Figure 18A:
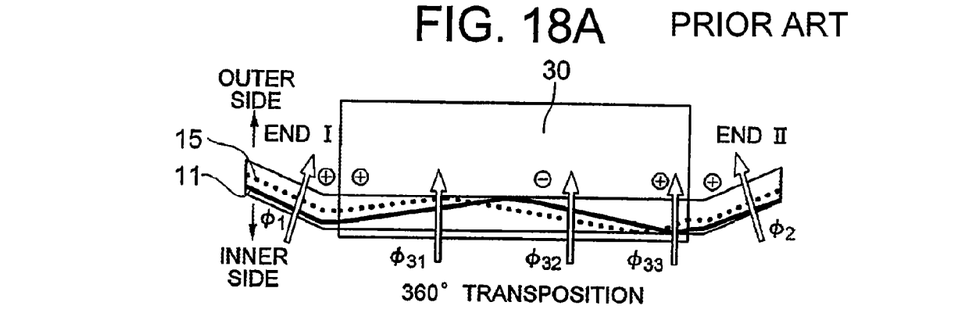
FIGS. 18A, 18B are conceptual diagrams illustrating how strands are arranged in a 540° transposition and in a 360° transposition, respectively.
Figure 18B:
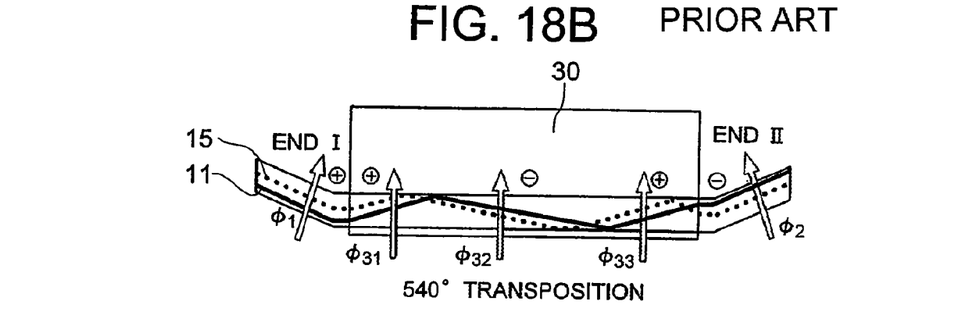

Armature windings for conventional turbine generators are described, for example, in U.S. Pat. No. 2,821,641. As illustrated in FIG. 17, in an example described in U.S. Pat. No. 2,821,641, a plurality of strands arranged in multiple tiers are transposed in the middle, and transpose angles of the strands are determined to be 360°, 540°, and the like, as shown in FIGS. 18A, 18B, depending on the power and mechanical dimensions of a particular type of machine for fitting in a slot, such that flux linkages are canceled out within the slot to reduce a loss caused by circulating currents which flow among strands. Specifically, as illustrated in FIG. 17, a strand 11 positioned at the topmost tier of the right row is transposed to the topmost tier of the left row, i.e., on a strand 1 ($2n$), and right-hand strands 12, 13 positioned at the topmost tier of the right row are sequentially transposed to make the overall winding in a stranded structure. Also, the transpose angle used herein is a 360° transposition in which strands 11, 15 wound from a shaft end I are transposed, and make a round to return to the same positions at a shaft end II, or a 540° transposition in which the strands are transposed further by an extra half cycle. In this event, the angle such as 360° and 540°, and the pitch of transposition are selected such that magnetic fields interlining between windings are canceled out within a fixed iron core 30. For example, the angle and pitch are selected such that a total of magnetic flux $\phi 31$ and $\phi 33$ interlining between strands 11 and 15 are equal to a magnetic flux $\phi 32$ which interlinks in a reverse direction.

Figure 19:
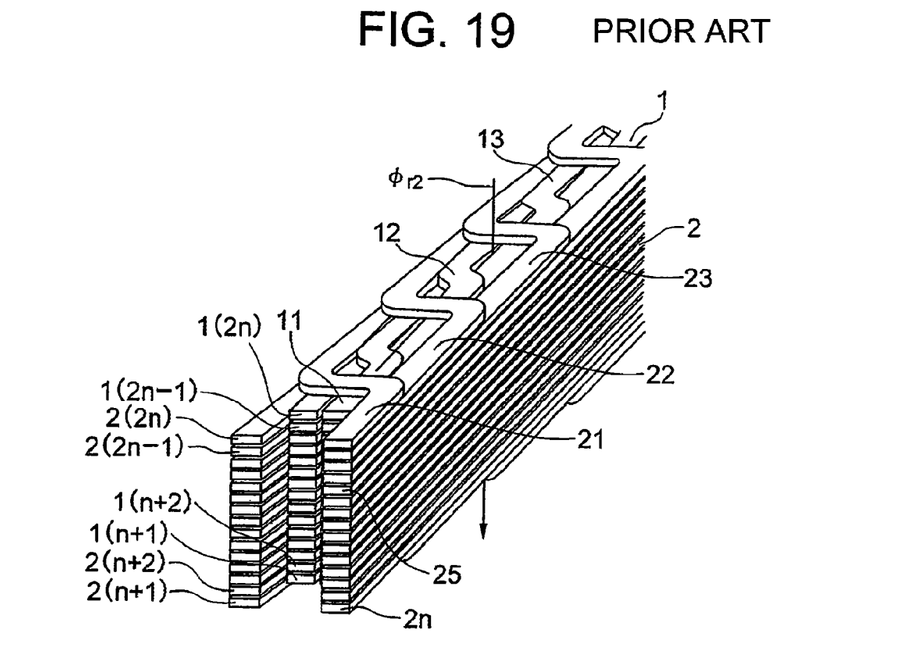
FIG. 19 is a partial perspective view illustrating how strands are transposed in JP-A-47-12513.

JP-A-47-12513 also describes armature windings for a turbine generator. As illustrated in FIG. 19, in this example, two rows of strand group 2 are disposed outside of a strand group 1 transposed over two rows, and strands 21, 22, 23 and the like are interposed to surround the strand group 1. This is intended to reduce a circulating current loss caused by a radial flux $\phi r2$.

In U.S. Pat. No. 2,821,641, even though strands are transposed in a strand group, a magnetic flux $\phi 1$ interlining at the end I and a magnetic flux $\phi 2$ interlining at the end II have the same polarity as each other through a transposition of 360°, so that a magnetic flux ($\phi 1+\phi 2$) interlinks within a closed loop defined by strands 11, 15, and the like. With a transposition of 540°, on the other hand, the magnetic flux $\phi 1$ interlinking at the end I of the strands 1, 15 and the magnetic flux $\phi 2$ interlinking at the end II have the polarities which cancel each other, but the magnetic fields $\phi 1$, $\phi 2$ are not equal in magnitude because the strands are different in radial position at the end I and end II. In other words, the flux linkage, corresponding to the difference ($\phi 1-\phi 2$) in field strength, remains, thus making it difficult to thoroughly cancel out circulating currents which flow around the strands 11, 15. Thus, there exists not a few current component which circulates among strands.

Figure 20:
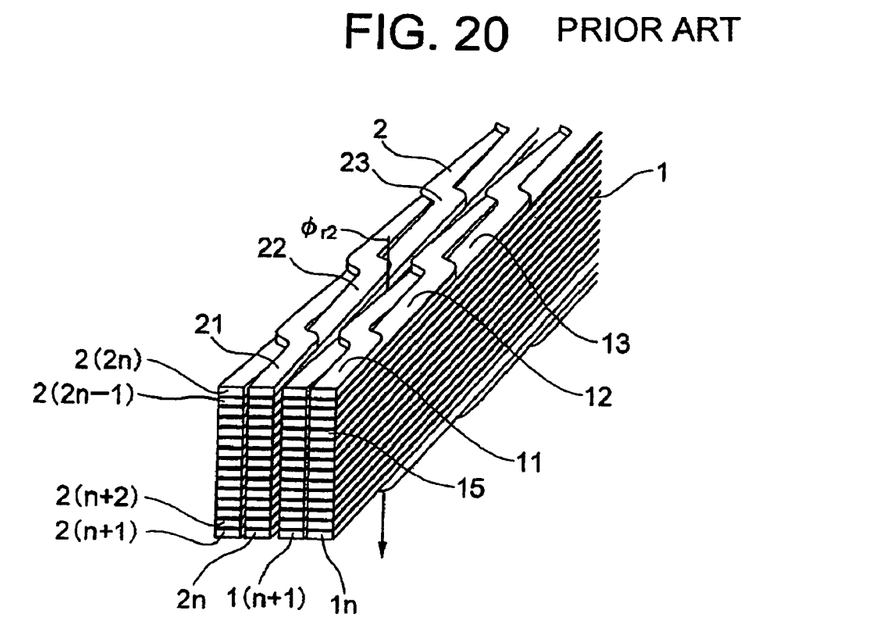
FIG. 20 is a partial perspective view illustrating how strands are transposed in a conventional four-row winding.

When a cross-sectional area of strands must be ensured, a winding as shown in FIG. 20 has been used, in which a plurality of transposed strand groups are arranged in parallel. Since such a structure cannot at all cancel out a radial magnetic flux $\phi r2$ which interlinks between the strand group 1 and strand group 2, even an increased currents circulate among the strands.

On the other hand, JP-A-47-12513, which is a technique for reducing the radial magnetic flux, involves a complicated structure in which the strand group 2 is arranged in a double configuration to surround the strand group 1, as illustrated in FIG. 19, requiring a large number of manufacturing steps. Also, for example, the strand 11 must be transposed onto a strand 1 ($2n$), and a strand 21 is further transposed on the step, thus making it difficult to maintain a uniform gap between strands. For this reason, an appropriate insulating strength cannot be maintained.

SUMMARY OF THE INVENTION

It is an object of the present invention to provide armature windings which solve the problems mentioned above, and a dynamo-electric machine using the same.

To achieve the above object, the present invention provides an armature winding which comprises a strand group having strands transposed and bound in at least two rows and multiple tiers, and a main insulator for covering the strand group, wherein a flow resistance of a current passing through the strands on an upper and a lower side in the cross-section of the strand group is set larger than a flow resistance of a current which passes through the strands in a central portion.

The present invention also provides an armature winding which comprises a plurality of strand groups each having strands transposed and bound in at least two rows and multiple tiers, and a main insulator for covering the plurality of strand groups, wherein a flow resistance of a current passing though at least one of the plurality of strand groups is set larger than a flow resistance of a current which passes through the remaining strand groups.

According to the present invention, it is possible to reduce a circulating current within the armature winding of a dynamo-electric motor to make the temperature uniform.

Other objects, features and advantages of the invention will become apparent from the following description of the embodiments of the invention taken in conjunction with the accompanying drawings.

DETAILED DESCRIPTION OF THE EMBODIMENTS

For describing some embodiments of the present invention, the structure of a turbine generator, to which the present invention is applied, will be generally described with reference to FIG. 1. The basic structure illustrated in FIG. 1 does not depend on the type of cooling fluid.

Figure 1:
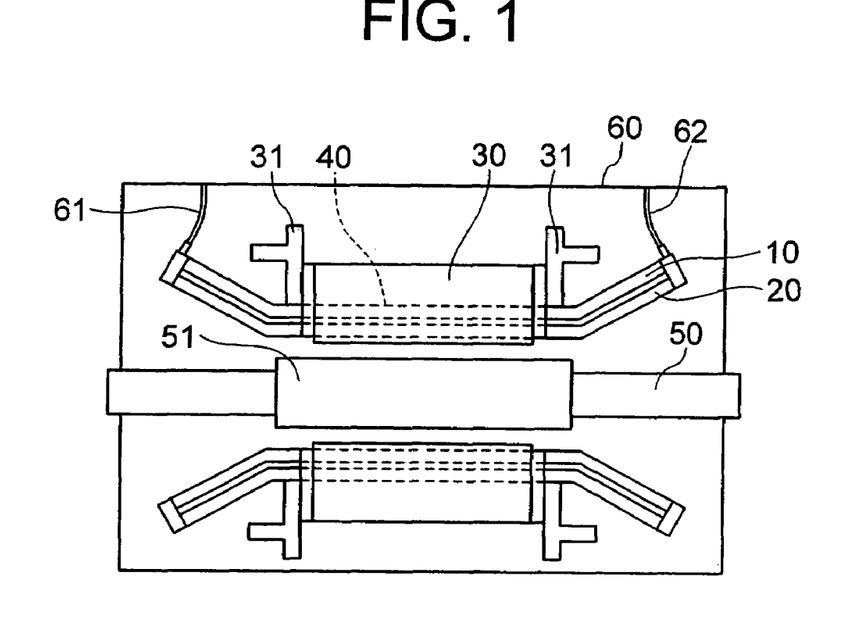
FIG. 1 is a general view illustrating an outline of a turbine generator which employs armature windings of the present invention.
Figure 3:
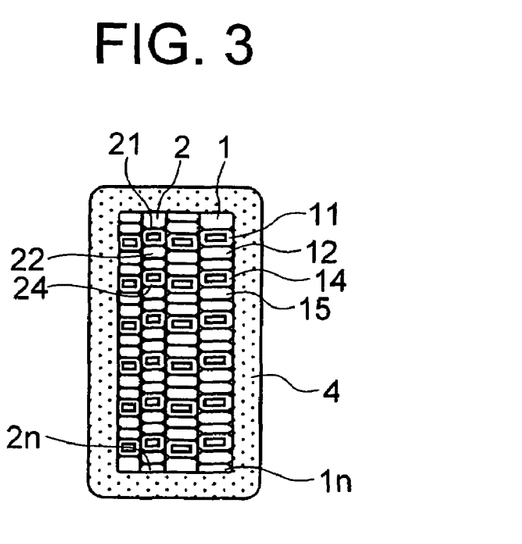
FIG. 3 is a cross-sectional view illustrating an armature winding according to a second embodiment of the present invention.

As illustrated in FIG. 1, a rotor 51 is rotatably supported by a rotating shaft 50 to a stator frame 60. The rotor 51 internally has field windings (not shown), and serves as a magnetic pole. A stator core 30 forms part of a stator assembly which is disposed opposite to the rotor 51 through a predetermined gap. The stator core 30 has both axial ends held by end clamps 31, and fixed to the stator frame 60. Armature windings 10, 20 are stored in each of a plurality of slots which extend in the axial direction of the stator core 30, and are disposed in the circumferential direction at predetermined intervals. For a water-cooled generator, a cooling water inlet passage 61 is provided at axial ends of the armature windings 10, 20, while a cooling water outlet passage 62 is provided on the opposite ends of the same, such that cooling water is passed in the axial direction through the hollow strands 11, 14 and the like, as illustrated in FIG. 3, which form part of the armature windings 10, 20, to directly cool the armature windings 10, 20.

Figure 2:
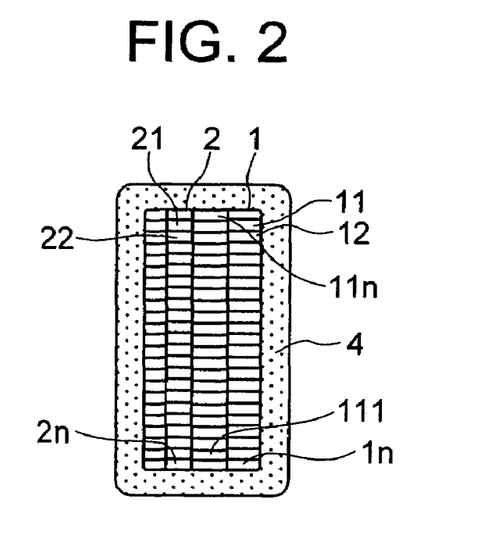
FIG. 2 is a cross-sectional view illustrating an armature winding according to a first embodiment of the present invention.

Generally, the armature windings 10, 20 each have a group of strands arranged, for example, in n rows and m columns, which is covered with a main insulator 4. The main insulator 4 is a structure for maintaining electric insulation between the inside and the outside of the winding, and is often made of mica or resin. FIG. 2 illustrates an example of the armature winding 10 or 20 comprised of four columns (m=4) and two rows (n=23) in cross-section taken along a direction perpendicular to the axis, wherein strands 1 are numbered 11, 12, . . . , 1n from the first row to the n-th row, where m, n are both arbitrary integers. Generally, strands are transposed every two rows to form a strand group. Likewise, in a four-column armature winding, strands are divided into groups 1, 2 of strands which are transposed every two row, as illustrated in FIG. 20. The same is applied as well to six columns or more.

First Embodiment

FIG. 2 illustrates an armature winding according to a first embodiment of the present invention. In the first embodiment, in the turbine generator illustrated in FIG. 1, a strand group 2, which forms part of the armature winding 10 covered with the main insulator, includes strands 21, 22, . . . , 2n, the cross-sectional area of which is chosen to be smaller than the cross-sectional area of strands 11, 12, . . . , 1n of a strand group 1, whereby the strand group 2 has a larger flow resistance of current than the strand group 1. The effects and principles of the foregoing will be discussed below.

Figure 16:
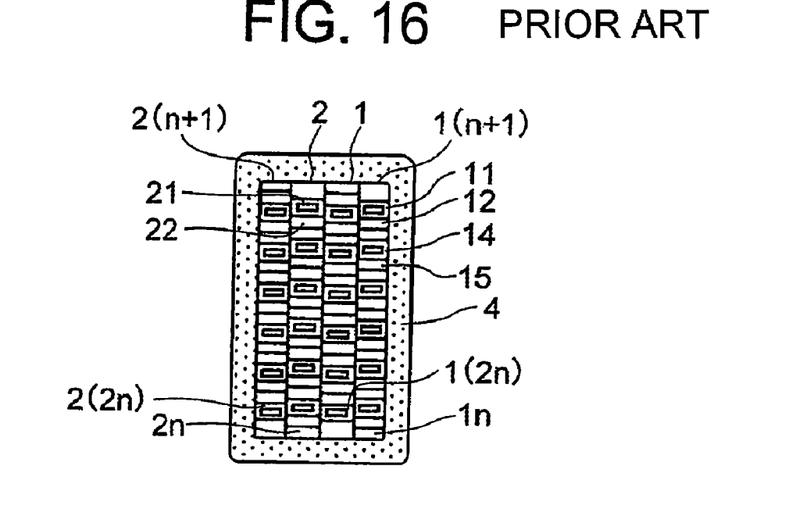
FIG. 16 is a cross-sectional view illustrating an example of a conventional armature winding.

As illustrated in FIG. 16, a general armature winding is comprised of a strand group 1 made up of two rows of strands 11, 12, . . . , 1n, 1(n+1), . . . , 1(2n), and a strand group 2 likewise made up of two rows of strands 21, 22, . . . , 2n, 2(n+1) . . . , 2(2n). The strand group 1 has the same cross-sectional shape as the second strand group 2. Here, the strands in the strand group 1 and strand group 2 are transposed through a transpose angle of 360°, 540° or the like, respectively, so as to cancel out magnetic fields which interlink within the stator core 30. The manner in which the strands are transposed has been shown in FIG. 20.

Figure 11:
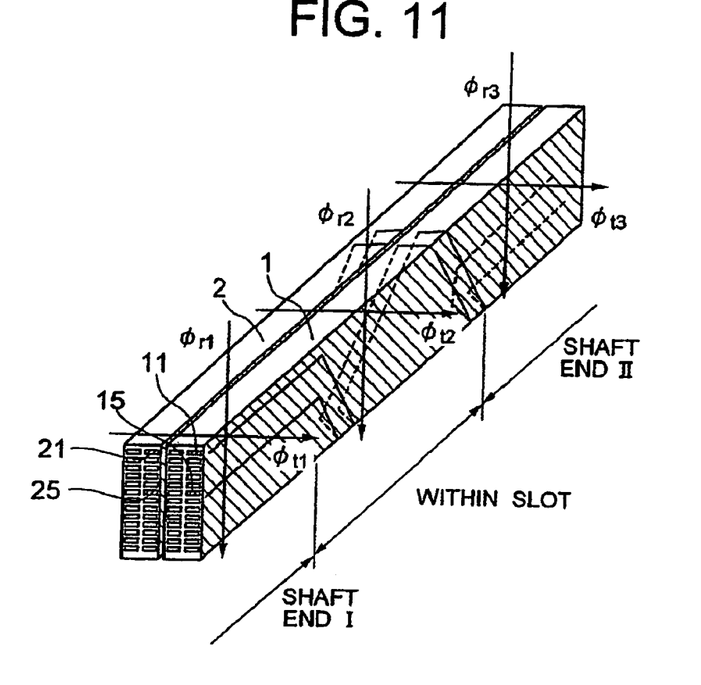
FIG. 11 is a diagram illustrating a concept of the whole length of armature windings using four rows of strands for explaining the relationship among a strand group, strands and flux linkage.
Figure 12:
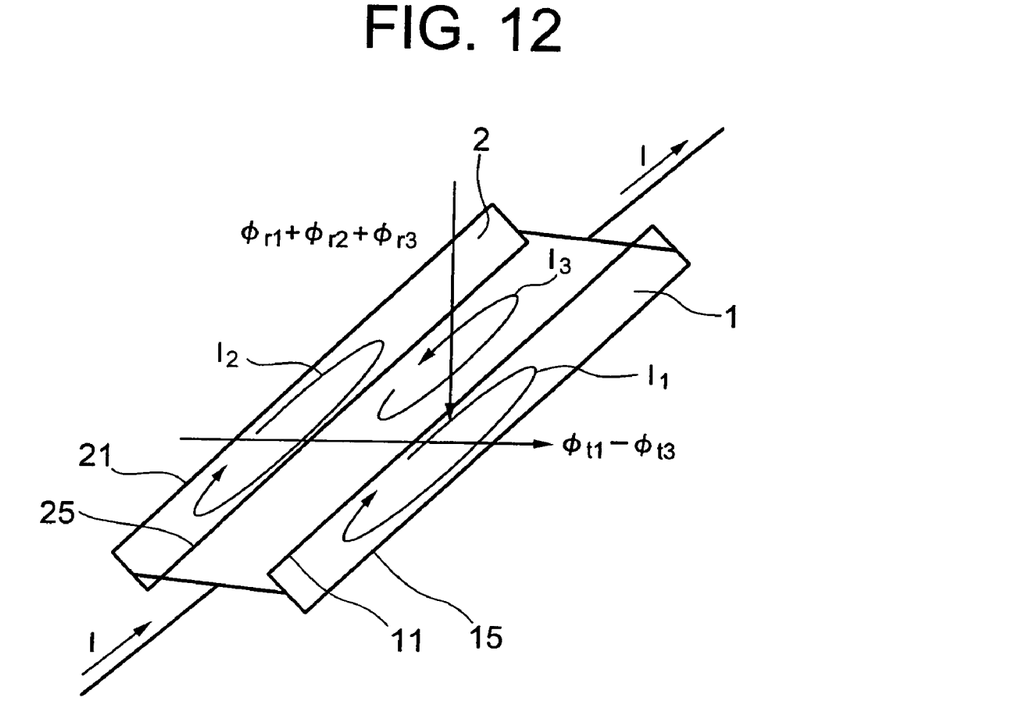
FIG. 12 is a diagram showing a relationship between the flux linkage and circulating current in FIG. 11.

The relationship among the strand groups, strands, and flux linkage will be described with reference to FIGS. 11, 12. Within a stator core, strands are transposed two rows by two rows, as illustrated in FIG. 20, however, no strands are transposed between the strand group 1 and strand group 2, so that a radial magnetic flux $\phi r2$ acts between the strand groups. Also, the strands are transposed only within the stator core, and are not transposed in end portions. Both strand groups are connected to each other at extreme ends. Here, representative strands 11, 15, 21, 25 are selected from the respective strand groups for the following description. The transpose angle is chosen to be 540° by way of example. As illustrated in FIGS. 11, 18A, 18B, strands belonging to the strand group 1 are transposed such that the flux linkage is eliminated within a slot, so that no circulating current is induced between the strands 11, 15 by magnetic fields such as $\phi r2$, $\phi t2$ and the like. On the other hand, regarding magnetic fields around the end I and end II, since the strands 11, 15 change places in vertical relationship, a circumferential magnetic flux $\phi t1$ at the end I and a circumferential magnetic flux φt3 at the end II act on the strands 11, 15 in opposite polarities. However, since the magnetic fields vary depending on radial positions, the flux linkages are not completely canceled out, but a slight circulating current flows. This applies to the strands 21, 25 of the strand group 2 as well.

Next, description will be made on the influence of a magnetic flux which links between the strand group 1 and strand group 2. These two strand groups are not transposed to each other, and a total of the radial flux linkage φr1 within the slot and the radial magnetic fluxes φr2, φr3 at the ends links between the two strand groups. FIG. 12 illustrates a circuit diagram of strand currents, where a current $I_0$ is calculated by dividing a current I of the overall armature winding by the number of strands, and represents an average current of the strands, and $I_1$ to $I_3$ represent circulating currents which are generated by magnetic fluxes that link to respective closed loops. The circumferential magnetic fluxes φt1-φt3 link between the strands 11 and 15 and between the strands 21 and 25, respectively, to induce the circulating currents $I_1$, $I_2$ which flow in a direction in which they cancel out the magnetic fluxes. On the other hand, the radial magnetic fluxes φr1 to φr3 link between the strand group 1 and strand group 2, i.e., between the strands 11, 15 and between strands 21, 25 to induce the current $I_3$ which flows in a direction in which it cancels out the magnetic fluxes. Stated another way, currents which flow through the strands 11, 15, 21, 25 are calculated as follows:

$$I_{11}=I_0+I_1+I_3$$

$$I_{15}=I_0-I_1+I_3$$

$$I_{21}=I_0+I_2-I_3$$

$$I_{25}=I_0-I_2-I_3 \quad (1)$$

The currents which flow through the respective strands are in a relationship given by:

$$I_{11}>I_{15}>I_{21}>I_{25} \quad (2)$$

It is understood from the above that the current values are different from one another on the respective strands.

Figure 13A:
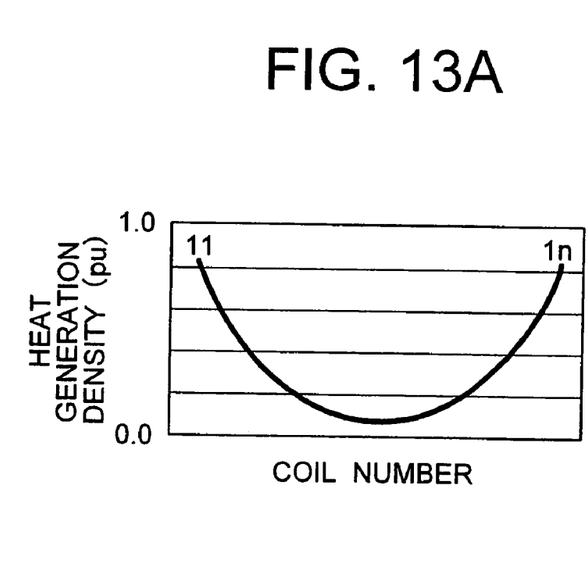
FIGS. 13A, 13B are a current distribution graph of a conventional two-row winding and a cross-sectional view in this structure.
Figure 13B:
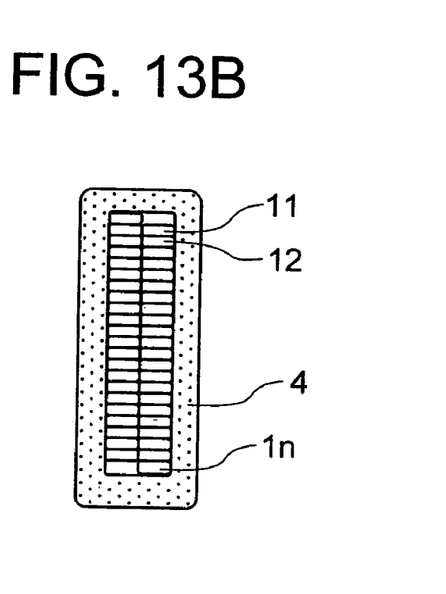
Figure 14A:
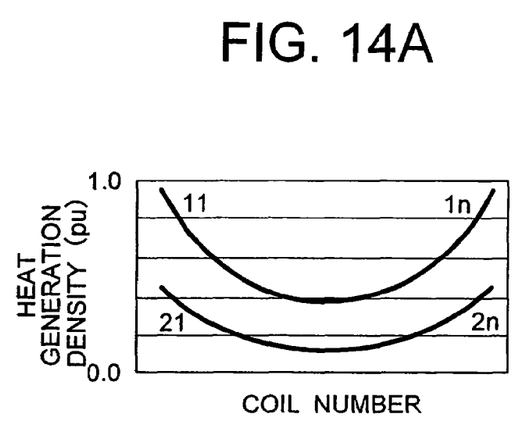
FIGS. 14A, 14B are a current distribution graph of a conventional four-row winding and a cross-sectional view in this structure.
Figure 14B:
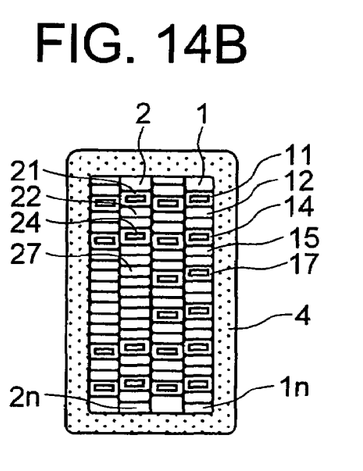
Figure 15A:
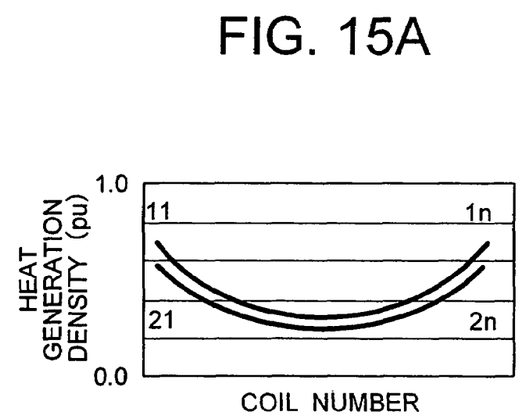
FIGS. 15A, 15B are a current distribution graph in this structure and a cross-sectional view of the winding according to the second embodiment of the present invention.
Figure 15B:
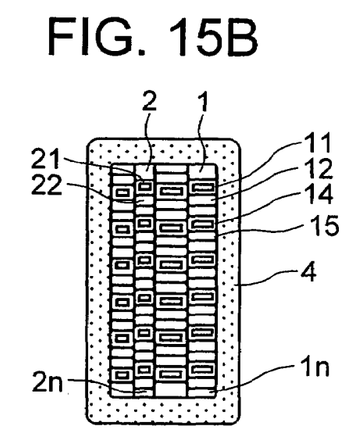

In this event, a strand current distribution in the conventional structure may be represented by FIGS. 14A, 14B. The strand group 1, through which a large strand current flows, generates larger heat, while the strand group 2 generates smaller heat. Here, in 540° transposition, larger heat is generated in an upper and a lower portion of the winding from the relation between the positions of strands and the linkage flux at the ends. For this reason, a current distribution is produced as illustrated in FIG. 13 even when there is only one strand group, resulting in non-uniform temperature. On the other hand, in the first embodiment, the strand group 2 has a smaller flow resistance of current than the strand group 1. Thus, as a closed loop which circulates the strand groups 1, 2 has a larger resistance, the circulating current $I_3$ can be reduced. The smaller $I_3$ can contribute to a reduction in $I_{11}$, $I_{15}$, as shown by Equation (1), resulting in a reduction in heat generated by the strand group 1. In regard to the strand group 2, the current is reduced as the resistance is increased, however, heat generated thereby tends to increase because the flow resistance of current is larger. In other words, as illustrated in FIG. 15A, the temperature within the cross-section can be maintained uniform by an increase in the heat generated by the strand group 2 and a reduction in the heat generated by the strand group 1.

While the foregoing embodiment has been described in connection with an example in which the strand group 2 has a larger flow resistance of current than the stand group 1, similar effects can be produced when the strand group 1 has a smaller flow resistance of current than the strand group 2. In the foregoing embodiment, the flow resistance of current is increased by uniformly reducing the width of all the strands within the strand group 2, but the present invention is not limited to this particular way. Instead, the flow resistance of current may be varied, for example, by changing the material, or by changing the height of the strands, the shape of the strands, and the number of tiers, as a matter of course.

Second Embodiment

FIG. 3 illustrates an armature winding according to a second embodiment of the present invention. The second embodiment illustrates an application to a water-cooled winding. The flow resistance of current is varied by uniformly reducing the width of all the strands (cross-sectional area of the strands) within the strand group 2 than the width of the strands (cross-sectional area of the strands) within the strand group 1. By reducing the cross-sectional area of the strands within the strand group 2 than the cross-sectional area of the strands within the stand group 1, a closed loop formed by the strand 11 and the like within the strand group 1 and the strand 21 and the like within the strand group 2 has a larger flow resistance of current, so that a circulating current which flows through the closed loop can be reduced. Also, by reducing the cross-sectional area of the strands within the strand group 2, through which a smaller current flows, the current density of the strand group 1 can be made equivalent to that of the strand group 2, resulting in uniform heat generation as well. In the second embodiment which is applied to a water-cooled winding, the strands 11, 14, 21, 24, and the like are in hollow structure for passing cooling water therethrough, where the strands 21, 24 and the like have a smaller water pass area than the strands 11, 14, making it possible to further make the temperature uniform because an appropriate amount of water can be taken in accordance with generated heat.

Third Embodiment

Figure 4:
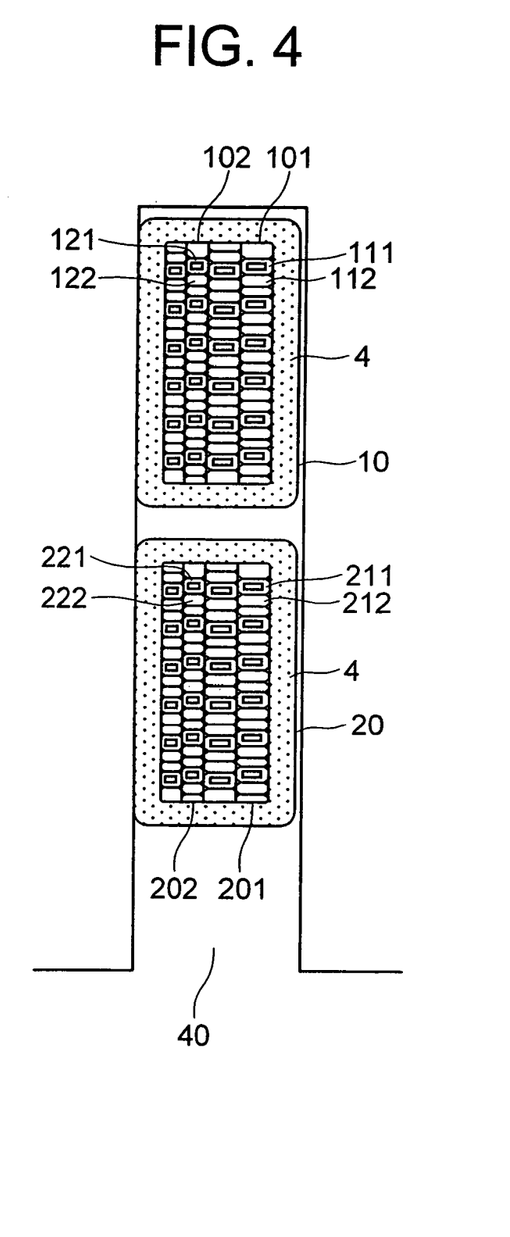
FIG. 4 is a cross-sectional view illustrating an armature winding according to a third embodiment of the present invention, when they are contained in a slot.

FIG. 4 illustrates an armature winding according to a third embodiment of the present invention. The third embodiment shows an example which has armature windings 10, 20 (hereinafter called the "top coil 20" and "bottom coil 10"), in the structure described in the second embodiment, piled two high within a slot 40. In this embodiment, the width of strands 121, 122, and the like (cross-sectional area of the strands) belonging to a strand group 102 of the bottom coil 10 is set smaller than the width of strands 111, 112, and the like (cross-sectional area of the strands) belonging to a strand group 101. In the top coil 20, the width of strands 221, 222, and the like (cross-sectional area of the strands) belonging to a strand group 202 is set smaller than the width of strands 211, 212, and the like of a strand group 201. In other words, the strands having a larger resistance are placed on the same side in regard to the horizontal direction of the slot in both the top coil 20 and bottom coil 10. This is effective when a current flowing through the top coil 20 has the same polarity as a current flowing through the bottom coil 10 so that radial magnetic fluxes having the same polarity act on the coils.

Fourth Embodiment

Figure 5:
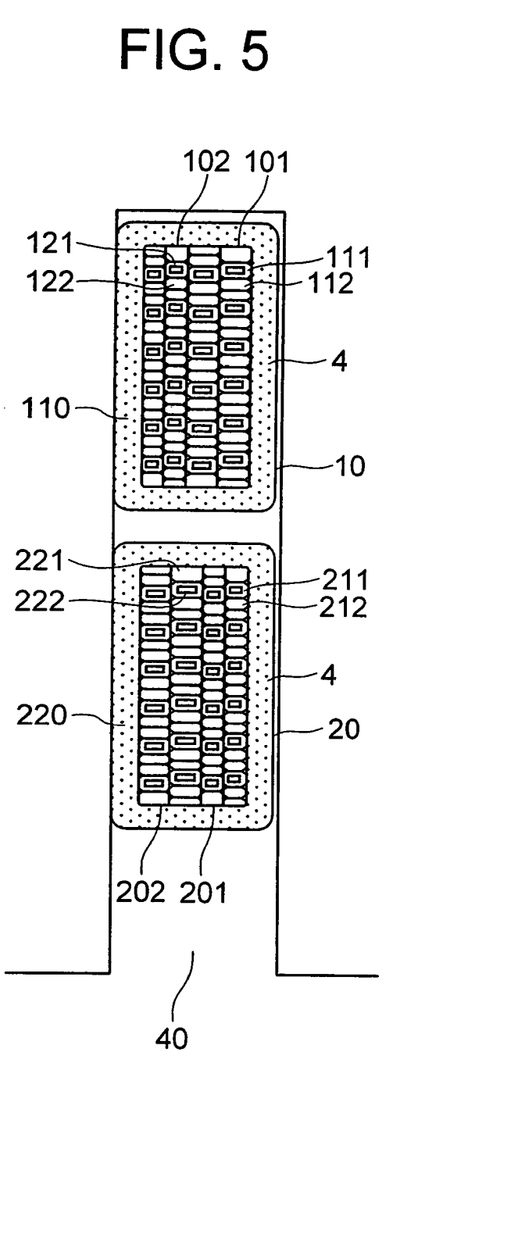
FIG. 5 is a cross-sectional view illustrating an armature winding according to a fourth embodiment of the present invention, when they are contained in a slot.

FIG. 5 illustrates an armature winding according to a fourth embodiment of the present invention. The fourth embodiment shows an example which has armature windings 110, 220 (hereinafter called the "top coil 220" and "bottom coil 110") placed in a slot 40, in which the structure described in the first embodiment is applied to a water-cooled windings. In this embodiment, the width of strands 121, 122, and the like (cross-sectional area of the strands) belonging to a strand group 102 of the bottom coil 110 is smaller than the width of the strands 111, 112, and the like (cross-sectional area of the strands) belonging to a strand group 101. In the top coil 220, the width of strands 211, 212, and the like (cross-sectional area of the strands) belonging to a strand group 201 is smaller than the width of strands 221, 222, and the like belonging to a strand group 202. In other words, the strands having a larger resistance are placed on the opposite sides in regard to the horizontal direction of the slot 40 in the top coil 220 and bottom coil 110. This structure is effective when a current flowing through the top coil 220 is opposite in polarity to a current flowing through the bottom coil 110, and radial magnetic fluxes acting on the top coil 220 and bottom coil 110 have the same polarity, or when a current flowing through the top coil 220 has the same polarity as a current flowing through the bottom coil 110, and acting radial magnetic fluxes have the opposite polarities.

Fifth Embodiment

Figures 6, 8:
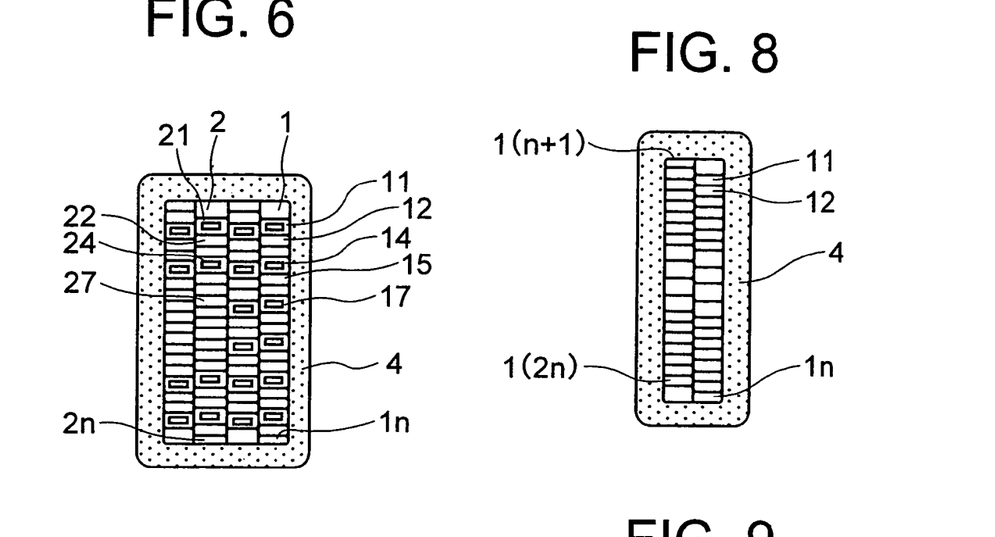
FIG. 6 is a cross-sectional view illustrating an armature winding according to a fifth embodiment of the present invention.
FIG. 8 is a cross-sectional view illustrating an armature winding according to a seventh embodiment of the present invention.

FIG. 6 illustrates an armature winding according to a fifth embodiment of the present invention. In the embodiment illustrated in FIG. 6, hollow strands 21, 24, and the like are placed only in an upper portion and a lower portion of a strand group 2, while a strand group 1 is similar in structure to the second embodiment (see FIG. 3). In the structure of such an embodiment, a smaller amount of cooling water can be provided to the strand group 2 which generates a reduced amount of heat, so that effective cooling can be accomplished as appropriate to a particular amount of generated heat. Also, since larger heat is generated in the upper portion and lower portion of the strand group 2, as illustrated in FIGS. 14A, 14B, these portions can be cooled in the structure of this embodiment, thereby improving the cooling efficiency.

Sixth Embodiment

Figures 7, 9, 10:
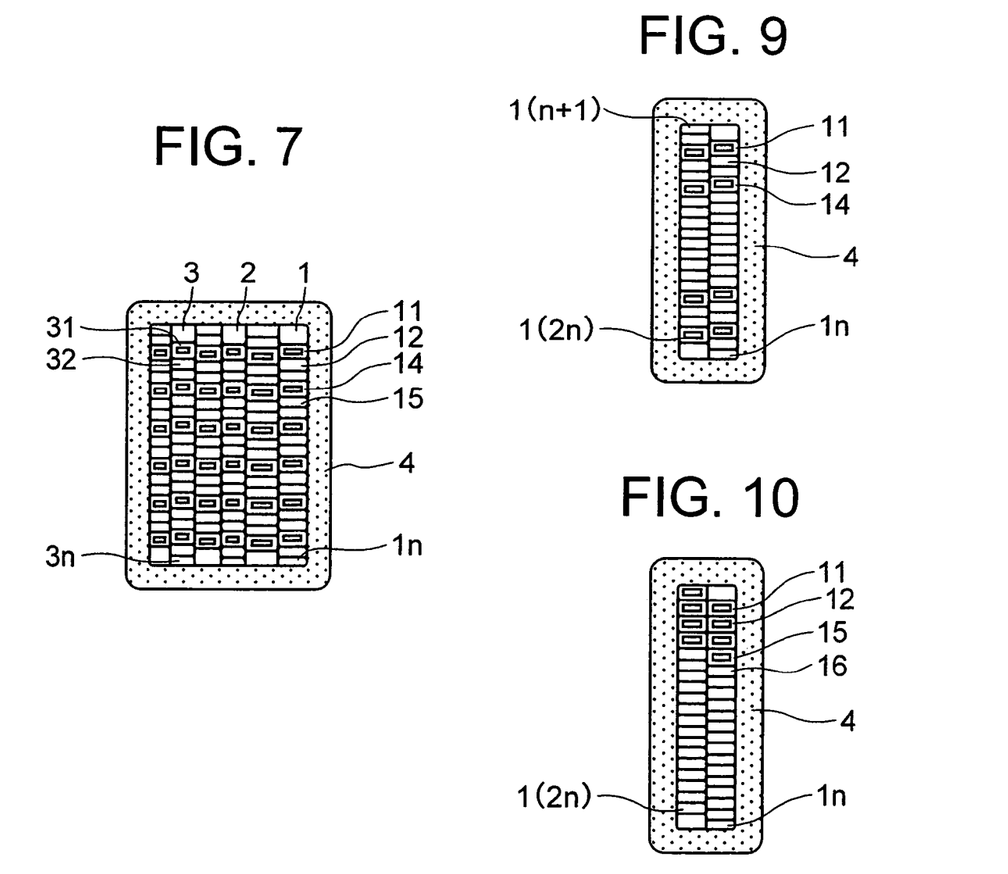
FIG. 7 is a cross-sectional view illustrating an armature winding according to a sixth embodiment of the present invention.
FIG. 9 is a cross-sectional view illustrating an armature winding according to an eighth embodiment of the present invention.
FIG. 10 is a cross-sectional view illustrating an armature winding according to a ninth embodiment of the present invention.

FIG. 7 illustrates an armature winding according to a sixth embodiment of the present invention. This embodiment shows an exemplary application to an armature winding which uses 6-row strands, and comprises three strand groups 1, 2, 3. In this example, the width of strands (cross-sectional area of the strands) belonging to the strand group 2 is smaller than the width of strands (cross-sectional area of the strands) belonging to the first strand group 1, and the width of strands (cross-sectional area of the strands) belonging to the strand group 3 is smaller than the width of the strands (cross-sectional area of the strands) belonging to the strand group 2. In this way, even when the number of strand groups is increased, similar effects can be produced as in the second embodiment which is comprised of two strand groups by increasing or decreasing the cross-sectional area of the strands in accordance with circulating currents which flow through the respective strands.

Seventh Embodiment

FIG. 8 illustrates an armature winding according to an eighth embodiment of the present invention. This embodiment shows an exemplary application to an armature winding comprised of a single strand group, and illustrates an exemplary arrangement of strands at an end. In a general two-row coil, the heat generation density is higher in an upper portion and a lower portion of a winding due to the influence of circulating currents, as illustrated in FIGS. 13A, 13B. To solve this problem, in this embodiment, the cross-sectional area of strands 11, 12, and the like in an upper portion and a strand in and the like in a lower portion, in which a larger amount of heat is generated, is smaller than the cross-sectional area of the remaining (central) strands. In other words, the flow resistances of currents passing through the strands in the upper and lower portions are set larger than the flow resistances of currents passing through central strands. By thus reducing the cross-sectional area of the strands in the upper and lower portions, it is possible to reduce an additional loss, for example, an eddy current loss produced in these portions and make the temperature uniform.

Eighth Embodiment

FIG. 9 illustrates an armature winding according to an eighth embodiment of the present invention. This embodiment shows an exemplary application to an armature winding comprised of a single strand group, wherein hollow strands 11, 14, and the like for water cooling are arranged in an upper portion and a lower portion, in which the heat generation density is higher, to better cool the upper and lower portions of the winding. In the structure of this embodiment, the upper and lower portions of the winding, in which a larger amount of heat is generated, can be cooled in a way to improve the cooling efficiency and make the temperature uniform.

Ninth Embodiment

FIG. 10 illustrates an armature winding according to a ninth embodiment of the present invention. This embodiment, which is created from a viewpoint different from the eighth embodiment, arranges hollow strands 11, 12, and the like only in an upper portion of a winding. With a strand transposition through 360°, the circulating current typically becomes largest on the upper side of armature windings 10, 20, so that this embodiment can cool this portion to make the temperature uniform.

According to the present invention, the circulating currents within the winding are reduced to eliminate locally heated portions, thereby making it possible to uniformly increase the temperature of the armature and reduce the increase in temperature.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An armature winding comprising:
   a strand group having strands transposed and bound in at least two rows and multiple tiers, said strands including solid strands and hollow strands through which a cooling medium passes; and
   a main insulator for covering said strand group,
   wherein said hollow strands are arranged only on an upper side in the cross-section of said strand group, and said solid strands are arranged in the remaining area.

2. An armature winding comprising:
   three strand groups each having strands transposed and bound in at least two rows and multiple tiers, said strands including solid strands and hollow strands through which a cooling medium passes; and a main insulator for covering said three strand groups,
wherein said strands belonging to a strand group positioned on one side of a strand group positioned at the center of said three strand groups have a cross-sectional area smaller than a cross-sectional area of said strands belonging to said central strand group, and said strand belonging to a strand group positioned on the other side of said central strand group has a cross-sectional area larger than the cross-sectional area of said strands belong to said central strand group.

* * * * *